United States Patent [19]
Batanist

[11] Patent Number: 6,039,134
[45] Date of Patent: Mar. 21, 2000

[54] MOTOR VEHICLE

[76] Inventor: Moisey Batanist, 1200 Gravesand Neck Rd., Brooklyn, N.Y. 11235

[21] Appl. No.: 08/953,368

[22] Filed: Oct. 17, 1997

[51] Int. Cl.[7] .............................. B60D 7/00; B62D 53/04; B62D 63/00
[52] U.S. Cl. ........................ 180/14.1; 180/11; 180/14.2; 180/14.4
[58] Field of Search ........................ 180/11, 14.2, 14.4, 180/14.1, 15, 16

[56] References Cited

U.S. PATENT DOCUMENTS

| | | | |
|---|---|---|---|
| 1,269,113 | 6/1918 | Patterson | 180/16 |
| 3,889,770 | 6/1975 | Herbert | 180/14.2 |
| 4,150,841 | 4/1979 | Ayotte | 280/446 |
| 4,361,200 | 11/1982 | Igarashi | 180/14.4 |
| 4,368,793 | 1/1983 | Igarashi | 180/14.4 |
| 4,385,771 | 5/1983 | Eckels | 280/400 |
| 5,272,609 | 12/1993 | Nelson | 362/250 |

FOREIGN PATENT DOCUMENTS

WO 86/04310   7/1986   United Kingdom .

Primary Examiner—J. J. Swann
Assistant Examiner—Christopher D. Bottorff
Attorney, Agent, or Firm—Ilya Zborovsky

[57] ABSTRACT

A motor vehicle comprising a first vehicle having a vehicle body defining a first inner space and a first drive for driving the first vehicle, and a second vehicle having a second vehicle body defining a second inner space and having a second drive for driving the second vehicle, the vehicles being substantially identical with one another, and elements for connecting the vehicles with one another, the first and second vehicle bodies having openable and closeable parts which close the first and second inner spaces of the first and second vehicles correspondingly and are formed such that the parts can be closed, the connecting elements disconnected and the vehicles can be used separately, and also the parts can be opened so as to communicate the first inner space with the second inner space, the connecting parts connect the first and the second vehicles with one another, so that the first and second vehicles form a joint motor vehicle for joint driving.

12 Claims, 1 Drawing Sheet

U.S. Patent — Mar. 21, 2000 — 6,039,134
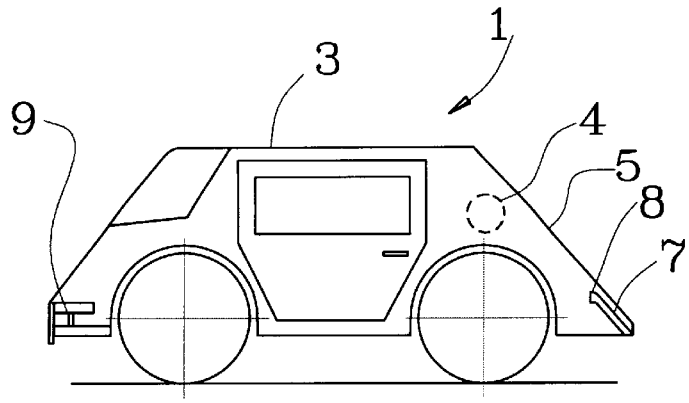
FIG. 1
FIG. 4
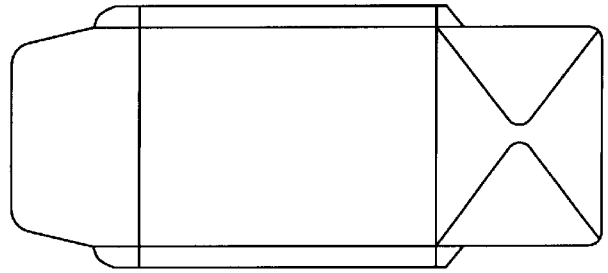
FIG. 2
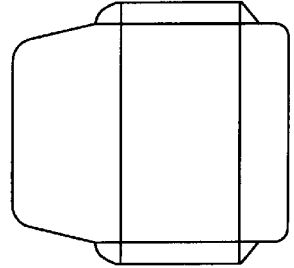
FIG. 5
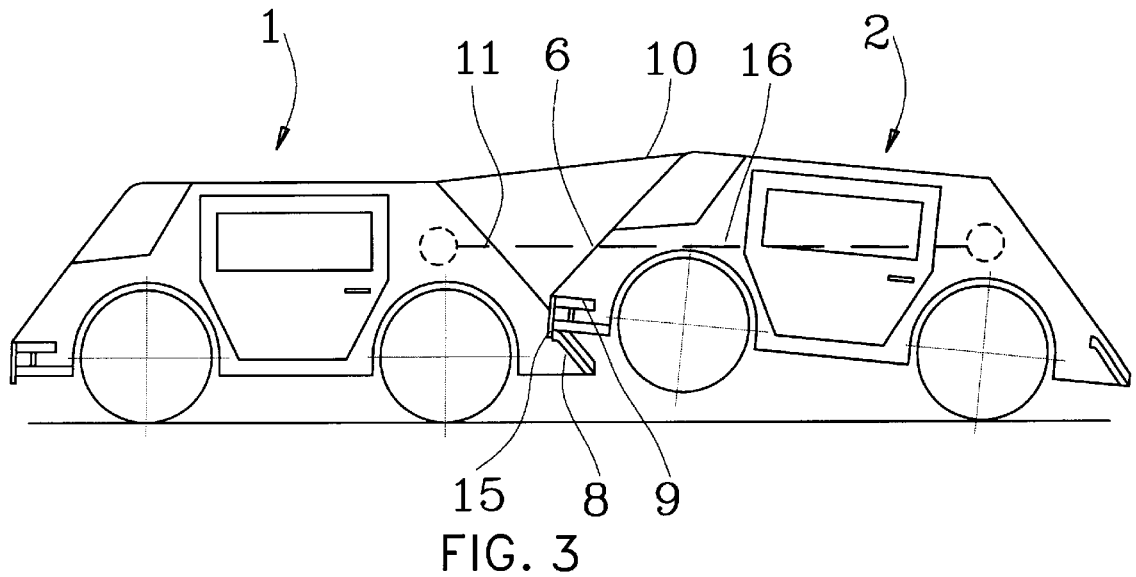
FIG. 3

MOTOR VEHICLE

BACKGROUND OF THE INVENTION

The present invention relates generally to motor vehicles, and in particular to passengers cars, In many cases modern passenger cars do not satisfy requirements applicable to them. On the one hand, for example in a family each working member of the family needs its individual car. It is well known that almost 90% of all motor vehicles are occupied by one or two people. For this purpose it is necessary to have a small and economical car. The small and maneurable car also make easier parking in a city and other crowded spaces.

On the other hand, for family events, for example vacation trips, entertainment trips, it is necessary to have a vehicle with a substantial inner space.

These two purposes are contradictory and there are no motor vehicles that can achieve both.

Accordingly, it is an object of present invention to provide motor vehicle which eliminates the disadvantages of the prior art and provide for the new highly advantageous results.

In keeping with these objects and with others which will become apparent hereinafter, one feature of present invention resides, briefly stated, in a motor vehicle which has a first vehicle having a vehicle body defining a first inner space and a first drive for driving said first vehicle; and a second vehicle having a second vehicle body defining a second inner space and having a second drive for driving said second vehicle; and means for connecting said vehicles with one another, said first and second vehicle bodies having openable and closeable parts so that said closeable parts are closed, said connecting means disconnected and said vehicles can be used to separately and also said closeable parts can be opened so as to communicate said first space with said inner space, said connecting parts connect said first and second vehicles with one another, so that said first and second vehicles form a joint motor vehicle for joint driving.

When the motor vehicle is designed in accordance with the present invention, the vehicles can be easily connected with and disconnected from one another. The connection of the two vehicles forms a single large vehicle which is suitable for several people, while each individual vehicles is suitable for one or two people.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1 and 2 are a side view and a plan view of one of the vehicles of a motor vehicle in accordance with the present invention;

FIG. 3 is a view showing the inventive motor vehicle in an assembled condition; and FIGS. 4 and 5 are a side view and a plan view of an attachment unit of the motor vehicle in accordance with the present invention.

DESCRIPTION OF PREFERRED EMBODIMENTS

A motor vehicle in accordance with the present invention in an assembled condition in FIG. 3. It has at least two vehicles 1 and 2 which can be identical, similar and even somewhat different from one another. One of the vehicles, in particular the vehicle 1 is shown in FIGS. 1 and 2. Each vehicle, for example the vehicle 1 has a body 3 which limits an inner space and a drive which is identified in general as 4. The drive can be formed as a conventional internal combustion engine with a transmission and an ignition system. Each of the vehicles 1, 2 has wheels and a steering system. The vehicle 1 in a rear part 11 has an openable and closeable rear door 5, while the vehicle 2 has in a front part an openable and closeable front door. Each of the vehicles in a rear part has an inclined plate 7 provided with rollers and a horizontal portion having substantially vertical openings 8. Each of the vehicles also has a corresponding opening 9 provided in a front part of the vehicle.

Since each of the vehicles 1 and 2 has its own body, wheels, as well as driving and steering system, they can be used separately as vehicles for a small number of occupants for example 1, 2, etc. On the other hand, the vehicles 1 and 2 can be connected with one another as shown in FIG. 3. For this purpose the rear door 5 of the front vehicle or the front door 6 of the rear vehicle are lifted and connected with one another by connecting means identified schematically by reference numeral 10, for example a simple lock. As a result, the inner space of the vehicle 1 becomes connected with the inner space of the vehicle 2. The doors 5 and 6 can be formed U-shaped so that in the lifted position they close not only the top of the thusly formed motor vehicle, but also the sides to provide an uninterrupted inner space closed from all sides. In order to obtain this condition, the vehicles are moved toward one another, and the front lower part of the vehicle 2 slides on the inclined plate 7 so that the front wheels of the vehicle 2 are lifted from the ground. Then pins 15 are inserted through the aligned openings 8 and 9 to connect the vehicles with one another. Also, a power connection 16, for example a power cable etc. connects the drives 4 for the vehicles 1 and 2 with one another or more particularly to connect the electrical circuits for both vehicles so as to transfer the control signals from one vehicle to the other. During travel it is possible to use either one drive of one vehicle or both drives of both vehicles.

Synchronization of the operation of both engines of the drives can be performed by known means, for example with the use of hydraulic converters. However, it is more efficient to provide synchronization for vehicles with an electric drive. Therefore, the vehicles 1 and 2 can be designed as electromobiles. Each electromobile can have a battery, and the batteries of the vehicles operate one after the other and are easily exchangeable. A control system detects a battery which is discharged, produces a corresponding signal, and activates the other battery.

In accordance with a further feature of present invention, the motor vehicle has an additional attachment unit which is identified as a whole with reference numeral 12. The attachment unit has a body 13 and includes a motor-generator assembly or an additional battery in the case if the vehicle has to travel a substantial distance and the capacity of its own battery is insufficient. Also, the body 13 of the unit 12 limits an inner space which can be formed as a trunk, or a storage.

It is also possible that the front wheels of the rear vehicle 2 can be hidden, for example by folding under the body in order to improve the appearance of the motor vehicle.

It will be understood that each of the elements described above, or two or more together, may also find a useful application in other types of constructions differing from the types described above.

While the invention has been illustrated and described as embodied in motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor vehicle comprising a first vehicle having a vehicle body defining a first inner space and a first drive for driving said first vehicle; and a second vehicle having a second vehicle body defining a second inner space and having a second drive for driving said second vehicle, said vehicles being identical with one another, and means for connecting said vehicle with one another, said first and second vehicle bodies having openable and closeable parts Which close said first and second inners spaces of said first and second vehicles correspondingly and are formed such that said parts can be closed, said connecting means disconnected and said vehicles can be used separately, and also said parts can be opened so as to communicate said first inner space with said second inner space, said connecting parts connect said first and said second vehicle with one another, so that said first and second vehicles form a joint motor vehicle for joint driving.

2. A motor vehicle as defined in claim 1, wherein said openable part of each of said vehicles is formed as an end part.

3. A motor vehicle as defined in claim 2, wherein said openable part of one of said vehicles is formed as a rear end part while said openable part of another of said vehicles is formed as a front end part.

4. A motor vehicle as defined in claim 1, wherein said connecting means include an inclined connecting element so that when said vehicles move toward one another one of said vehicles is somewhat lifted on said inclined connecting element to lift wheels of said one vehicle from the ground.

5. A motor vehicle as defined in claim 1; and further comprising a power connection which connects said first drive of said first vehicle with said second drive of said second vehicle, so that said drives can be operated jointly and drive said first and second vehicles simultaneously.

6. A motor vehicle as defined in claim 1, wherein said closeable and openable parts of said vehicles are connectable with one another; and further comprising means for connecting said closeable and openable parts with one another.

7. A motor vehicle as defined in claim 1; and further comprising an additional unit provided with wheels and attachable to each of said vehicles, said additional unit including a motor and a generator.

8. A motor vehicle as defined in claim 7, wherein said additional unit has a storage space.

9. A motor vehicle as defined in claim 1; and further comprising an additional unit provided with wheels and attachable to at least one of said vehicles, said additional unit including an additional battery.

10. A motor vehicle, comprising a first vehicle having a vehicle body defining a first inner space and a first drive for driving said vehicle; and a second vehicle having a second vehicle body defining a second inner space and having a second drive for driving said second vehicle, said vehicles being identical with one another; means for connecting said vehicles with one another, each of said first and second vehicle bodies having an openable end door formed so that said openable end doors can be closed, said connecting means disconnected and said vehicles can be used separately and also said end doors can be opened so as to communicate said first inner space of said first vehicle with said second inner space of said second vehicle, said connecting parts connect said first and second vehicle with one another, so that said first and second vehicles form joint motor vehicle with a joint inner space for a joint driving.

11. A motor vehicle as defined in claim 10, wherein one of said vehicles has an inclined plate provided in its rear end so that a front end of the other of said vehicles can slide on said inclined plate and be lifted from the ground.

12. A motor vehicle as defined in claim 11, wherein each of said vehicles has a rear part provided with an inclined plate over which a front part of another vehicle can slide and also with a horizontal portion having a substantially vertical opening, while each of said vehicles also has a corresponding opening provided in a front part of each vehicle, so that the openings can be brought in alignment with one another; and further comprising a pin insertable in said align openings.

* * * * *